United States Patent
Schlusemann

(10) Patent No.: US 6,416,118 B1
(45) Date of Patent: Jul. 9, 2002

(54) ARRANGEMENT FOR ABSORPTION OF ENERGY RELEASED ON IMPACT

(75) Inventor: Thomas Schlusemann, Gottmadingen (DE)

(73) Assignee: Alusuisse Technology & Management Ltd. (CH)

( * ) Notice: Subject to any disclaimer, the term of this patent is extended or adjusted under 35 U.S.C. 154(b) by 0 days.

(21) Appl. No.: 09/677,935

(22) Filed: Oct. 3, 2000

(30) Foreign Application Priority Data

Jun. 10, 1999  (EP) ............................................. 99810906

(51) Int. Cl.$^7$ ................................................. B60J 7/00
(52) U.S. Cl. ...................... 296/189; 296/188; 296/182; 296/183; 296/204; 105/422
(58) Field of Search ................................ 296/188, 189, 296/182, 183, 204; 105/422

(56) References Cited

U.S. PATENT DOCUMENTS

| | | | |
|---|---|---|---|
| 3,520,550 A | | 7/1970 | Dysarz |
| 3,888,502 A | * | 6/1975 | Felzer et al. ................... 296/31 |
| 4,413,856 A | * | 11/1983 | McMahan et al. ........... 296/188 |
| 5,364,158 A | * | 11/1994 | Watanabe et al. ............ 296/189 |
| 5,425,561 A | * | 6/1995 | Morgan ........................ 293/120 |
| 5,593,182 A | * | 1/1997 | Frost ............................ 296/189 |
| 5,704,644 A | * | 1/1998 | Jaggi ............................ 296/204 |
| 5,876,078 A | * | 3/1999 | Miskech et al. ............. 296/188 |
| 6,056,337 A | * | 5/2000 | Oguri et al. ................. 296/188 |
| 6,068,329 A | * | 5/2000 | Miller .......................... 296/189 |
| 6,113,178 A | * | 9/2000 | Faigle .......................... 296/189 |
| 6,199,924 B1 | * | 3/2001 | Oguri et al. ................. 293/142 |
| 6,299,239 B1 | * | 10/2001 | Sagawa et al. .............. 296/188 |
| 2001/0024053 A1 | * | 9/2001 | Takase et al. ............... 296/189 |

FOREIGN PATENT DOCUMENTS

| | | |
|---|---|---|
| DE | 1816428 | 7/1969 |
| DE | 4440426 | 5/1996 |
| DE | 19611934 | 4/1997 |
| EP | 0802100 | 10/1997 |
| FR | 2635064 | 2/1990 |
| FR | 2698840 | 6/1994 |
| JP | 58-89475 | * 5/1983 |

* cited by examiner

Primary Examiner—Ken Patel
(74) Attorney, Agent, or Firm—Bachman & LaPointe, P.C.

(57) ABSTRACT

An arrangement for absorption of the energy of impact for road or rail bound vehicles contains an elongated insert (6)—in the form of a rigid lever or as part of a lever of length r and featuring two end faces (10, 11), the first end face (10) being attached to the long side of a section component (3) and the second face (11) coupled via a collision component (12) to an impact area (9) projecting out from the section component (3) in such a manner that a force of impact acting on the impact area (9), while displacing the collision component (12) in the direction of the force of impact, effects a rotational movement (D) of the insert (6) about a predetermined point of rotation (P) in the section component (3) and local bending of the section component (3) at the point of rotation (P). As a result of the arrangement according to the invention the section component (3) is bent out of the direction of the force of impact, so that the force of impact acting on its cross-section causes the section component (3) to bend in a continuous manner and the force of impact is absorbed.

12 Claims, 2 Drawing Sheets

ARRANGEMENT FOR ABSORPTION OF ENERGY RELEASED ON IMPACT

BACKGROUND OF THE INVENTION

The present invention relates to an arrangement for absorption of energy released on impact, in particular for road or rail bound vehicles.

It is known to attach energy absorbing components to the vehicle structure or to integrate them in the vehicle structure. The purpose of these components is to absorb, partially or completely, when the vehicle suffers impact causing energy to be released. The energy of impact is as a rule converted to heat along with the deformation of the component.

The purpose of energy absorbing components is to protect persons, freight and the load bearing structure or sensitive devices in the vehicle from being damaged by reducing the maximum force or negative acceleration i.e. to dampen the impact or thrust. Furthermore, when a moving train or road vehicle collides with an obstacle, the passenger compartments should not be subjected to high acceleration and should be deformed as little as possible.

Various forms of reversible and irreversible deformable energy absorbing components are known. For example, hollow sections are employed as energy absorbers which consume energy by being crushed and folded in the longitudinal direction. Furthermore honeycomb components or foamed bodies which likewise transform the energy of impact into thermal energy by deformation are known. Also known are hollow structures which on impact are filled with an energy absorbing fluid.

What these components have in common is that as a rule they do not feature any components that are integrated in the vehicle structure, but rather represent additional constructions on the periphery of the vehicle.

In the case of railway vehicles it is known e.g. to install between the coupling and the under-carriage an energy absorbing component which at average impact velocities of up to 60 km/h take up a part of the energy generated on impact. For that reason it is also known in the case of railway vehicles to employ buffers or anticlimber devices to absorb or divert forces of impact acting in the longitudinal direction of the vehicle.

The known applications suffer the disadvantage that they require a relatively large amount of space as the energy that can be absorbed by components depends to a large extent on the possible path of deformation of a deformable structure. For functional or legal reasons, in many applications in vehicle manufacture there is, however, only limited space available for energy absorbing structures. Furthermore energy absorbing components result in high vehicle weight as these generally have no additional functions in the vehicle structure.

As a rule known structures for absorbing the energy of impact ensure complete absorption of energy only for small and medium impact forces. If the energy of impact is large, as a result of the immediate effect of the force acting on the structural frame, after the path of deformation has been overcome, a pronounced peak in the force and acceleration is produced in particular in the longitudinal beam of the vehicle.

Further, there is a need to retrofit existing vehicle structures with energy absorbing components in order e.g. to increase the degree of safety and to bring the vehicles up to present day standards. For reasons of design or for economic reasons, however, there are hardly any suitable means that would allow a vehicle to be retrofitted in this manner.

The object of the present invention is therefore to provide an arrangement for absorbing the energy of impact which occupies less space than is state-of-the-art, whereby the arrangement should fulfil other functions in the vehicle structure. Further, the above mentioned arrangement should, e.g. in addition to other energy absorbing components, absorb energy of impact and break the peak forces, in particular when strong forces of collision prevail.

SUMMARY OF THE INVENTION

The foregoing object is achieved by way of the invention in that a first end face of an insert is attached at an angle to the long side of a section component and a second end face of the insert is coupled to an impact-area projecting out a distance "a" from the end face of the section component to such an extent that a force of impact acting on the impact area, while displacing a collision component in the direction of the force of impact, effects a rotational movement of the insert about a predetermined point of rotation P in the section component and local bending of the section component at the point of rotation P by some degrees of angle.

By section component in this text is to be understood a lengthy component with a cross-section that is constant or varies along its length. The section component is preferably a load bearing support beam in a vehicle structure, in particular in the vehicle frame. The support beam is to advantage a beam running in the longitudinal direction of the vehicle.

The insert is usefully in the form of a rigid lever arm or part of a lever arm of length "r" and is attached by a first end face at an angle to the long side of a section component and coupled by a second end face, preferably via a collision component, to an impact area.

By locally weakening the section component it is possible e.g. to situate the point of rotation, i.e. the kinking or bending point, in the section component. If the section component does not feature any particular point of weakness, then for structural reasons the point of rotation generally lies at the edge of the connection between the insert and the section component.

In a particularly useful version of the invention the insert is in the form of a rigid lever arm and is joined by its end face at an angle to the long side of a section component, and the point of rotation lies in the section component at the edge of the connection between the insert and the section component in such a manner that a force of impact acting on the impact area effects rotation of the insert about a radius which is equal to the length of the insert and effects local bending of the section component.

The impact area projects out from the section component i.e. out from the end face of the section component usefully a distance a. When two vehicles collide or when a collision occurs with an obstacle, the force of impact strikes first the intended impact area. Due to the rotation of the insert, the impact area is displaced a distance "a", possibly accompanied by deformation of intermediate energy absorbing parts. Only after the impact area has been displaced the distance "a" does the force of impact meet the cross-section of the section component.

After the impact area has been displaced a distance "a" in the direction of the force i.e. up until the force of impact acts on the cross-section or on the end face or end face area of the section component, the section component or the length of section component is usefully bent an angle of 0 to 30°, advantageously 0 to 10° about the point of rotation P from its original position.

The distance a is of such a dimension that at the point in time at which the force of impact acts on the cross-section of the section component, the section component—as a result of the rotation of the insert—has already been bent an angle of the above mentioned order of magnitude.

The section component lies advantageously in the same direction as the expected force of impact. The insert is usefully attached by its end face to the section component at an angle of 0° to 180°, preferably 45° to 135°, in particular 80° to 100°.

The insert is usefully mounted to an end part of the section component close to the expected force of impact. The end part of the section component may accommodate further attached components or joining components. On impact these attached components usefully behave in such a manner that do not delay or hinder the bending of the end part of the section component.

Impact usually occurs in the front or rear part of the vehicle with the main force of impact acting in the longitudinal direction of the vehicle. In a preferred version of the invention the arrangement according to the invention is therefore in the form of a front or rear means of protection against impact forces. The section component is a longitudinal beam of the vehicle; the insert is advantageously positioned at the front or rear end part of the longitudinal beam.

On impact the arrangement according to the invention produces bending that causes that part of the section component lying closest to where impact occurs to undergo a favourable change of direction in such a manner, that the force of impact acting increasingly on the cross-section of the section component causes the same to adopt a uniform, controlled kinking movement, during which the said impact forces are absorbed.

An insert may be a hollow section such as a single or multi-chamber hollow section, an open section such as a U-section, V-section, T or double T-shaped section, a pipe, rod, flat part such as e.g. a sheet, in particular a structured sheet or a combination of the above mentioned shapes. Further, the insert may be of a rope. Preferred is a sheet, in particular a structured sheet. The thickness of the sheet may be e.g. less than 10 mm, in particular less than 5 mm. The insert may be of a ferrous metal such as iron, tin or zinc coated iron, steel, steel alloys or of a non-ferrous metal such as magnesium and its alloys, and in particular aluminium and its alloys, reinforced plastic, in particular fibre reinforced plastic, or a combination of the above mentioned materials, in particular a metal-plastic composite.

The arrangement according to the invention usefully contains a collision component with an impact area—usefully peripheral and transverse to the expected main components of direction of impact—for the purpose of absorbing and transmitting the energy of impact. The collision component is joined to the insert, usefully rigidly joined via connecting elements in such a manner that the energy of impact is partially or wholly diverted into the insert. The collision component may be joined in such a manner with the insert that on impact it moves together with the insert about the point of rotation P. In a preferred version of the invention the connection between the insert and the collision component is such that on impact the collision component is displaced in the longitudinal direction of the vehicle.

The collision component may also be attached to a load bearing floor structure of the vehicle. The attachment is advantageously such that the energy of impact is transmitted essentially from the collision component to the insert. The collision component may be a, possibly modified, functional component of the vehicle structure e.g. in the case of a railway vehicle a buffer or coupling device or an anti-climbing device. The collision component may also be an integral component of an insert.

The load bearing floor structure may be a frame construction of e.g. longitudinal side beams joined by transverse beams. Further, the load bearing floor structure may contain a floor made up e.g. of floor sections oriented longitudinally and/or transverse to the direction of movement of the vehicle i.e. sections such as single and/or multi-chamber hollow sections, whereby the floor sections are arranged in rows with the long sides running in the same direction and joined together by welding or by means of bolts, rivets, adhesives, clamps and the like or combinations thereof, whereby the vehicle floor sections are supported by longitudinal beams or bottom flanges of the vehicle. The vehicle floor structure may also be a floor of panels, in particular composite panels or floor sheets.

The vehicle floor structure may be made up of reinforced plastic, in particular fibre-reinforced plastic, of a ferrous metal such as iron, tin or zinc coated iron, steel, an alloy of steel, or out of a non-ferrous metal such as magnesium and its alloys, and in particular aluminium and its alloys, or out of a combination of the above mentioned materials, in particular a metal-plastic composite.

A vehicle floor situated between the longitudinal beams or bottom flanges usefully exhibits a lower degree of stiffness in the direction of impact than the insert, with the result that when collision occurs, the insert can be made to rotate along with the deformation of the floor.

In a preferred version of the invention the insert is joined at least at places, partially or wholly to the vehicle floor so that a part of the energy of impact is absorbed during the rotation of the insert over a large area of the floor as the floor is deformed.

By joining the insert to the vehicle floor the rigidity of the connection between the collision element and the section component is increased. The insert can therefore be less rigid in its concept. It can in particular be of large area or be in sheet form, as twisting of the sheet during impact is prevented due to its connection to the vehicle floor.

The insert is attached to the section component e.g. by means of welding, bolting, riveting or adhesive bonding or a combination thereof. The connection may be made by virtue of force, fit or friction, or a combination thereof.

If the insert is in sheet form, then it may exhibit an angled, in particular a 90° angled, first end face and be joined by this face to the section component by means of welding, or be joined to the section component by bolts or rivets penetrating the angled end face. Further, the second end face of the insert may also feature an angled, in particular a 90° angled, end face functioning as a place for joining in the above described manner. By angled is to be understood the sheet being bent at the end about an angle between 0 and 180°.

The section component may have any desired cross-section. It may e.g. be a hollow section such as a single or multi-chamber hollow section, an open section such as a V-shaped, T-shaped or double T-shaped section, or a combination of these cross-sections. The section component is preferably a hollow section, in particular a multi-chamber hollow section. The section component may be of reinforced plastic, in particular fibre-reinforced plastic, of a ferrous metal such as iron, tin or zinc coated iron, steel, alloy of steel, of a non-ferrous metal such as magnesium and its alloys, and in particular of aluminium and its alloys, or a combination of the above mentioned materials, in particular a metal-plastic composite.

Between the impact area and the insert one may install further energy absorbing components such as hollow sections, honeycomb structures and the like which e.g. absorb energy when the impact forces are small to medium, this before rotation of the insert i.e. deformation of the section component begins. Also, further energy absorbing components of the arrangement according to the invention may be provided further from the area of impact so that, when the energy absorbing capacity of the arrangement according to the invention has been exhausted, these energy absorbers are activated.

In a preferred version of the invention further energy absorbers are provided in the vehicle floor such that, during the rotation of the insert or bending of the section component, these are deformed and absorb additional energy. The additional energy absorbers are to advantage hollow sections in the floor of the vehicle arranged transverse to the expected main components of the direction of impact.

In a further version of the invention a plurality of inserts according to the invention may be arranged one behind the other on the same or different section components, or side-by-side on different section components. By the arrangement of a plurality of inserts it is possible e.g. to weaken the section component significantly so that on impact at no point in time does the force of impact create a peak stress that acts fully on the cross-section of the section component, but instead is absorbed more by successive bending of the section component.

The insert may also be a structural part of the vehicle floor structure and e.g. fulfil a load bearing or stiffening function in the floor.

The arrangement according to the invention functions independent of direction. The arrangement achieves a particularly high degree of effectiveness when the force of impact acts at right angles to the insert.

Particularly advantageous fields for application of the energy absorbing structure according to the invention are: collision and undercarriage protection for lorries, collision protection in private cars, or collision protection in railway vehicles.

With the arrangement according to the invention it is possible to maintain a constant force of impact without peak forces—which permits optimal energy absorption over a short distance of deformation.

The arrangement according to the invention for absorbing the energy released on impact also exhibits the advantage that deformation is diverted into areas in the vehicle structure where—specifically for each vehicle—the consequences are least damaging to its fittings and passengers. Further, the arrangement according to the invention permits energy to be absorbed in spite of the limited space available. The arrangement requires no special adaptation and optimising in the vehicle structure, in particular in the floor structure of the vehicle, and can be retrofitted to existing vehicles. Further, the arrangement may be employed without specific weakening of the vehicle structure. On impact, as a result of the arrangement according to the invention, parts of the vehicle structure can be forced into a deformation mode which, with respect to the forces acting on impact, paths and energies, due to the initial geometry of the vehicle structure is more favourable than the mode that would result without this influence.

BRIEF DESCRIPTION OF THE DRAWINGS

The invention is explained in the following by way of example and with the aid of the accompanying drawings which show in.

DETAILED DESCRIPTION

Figure 1:
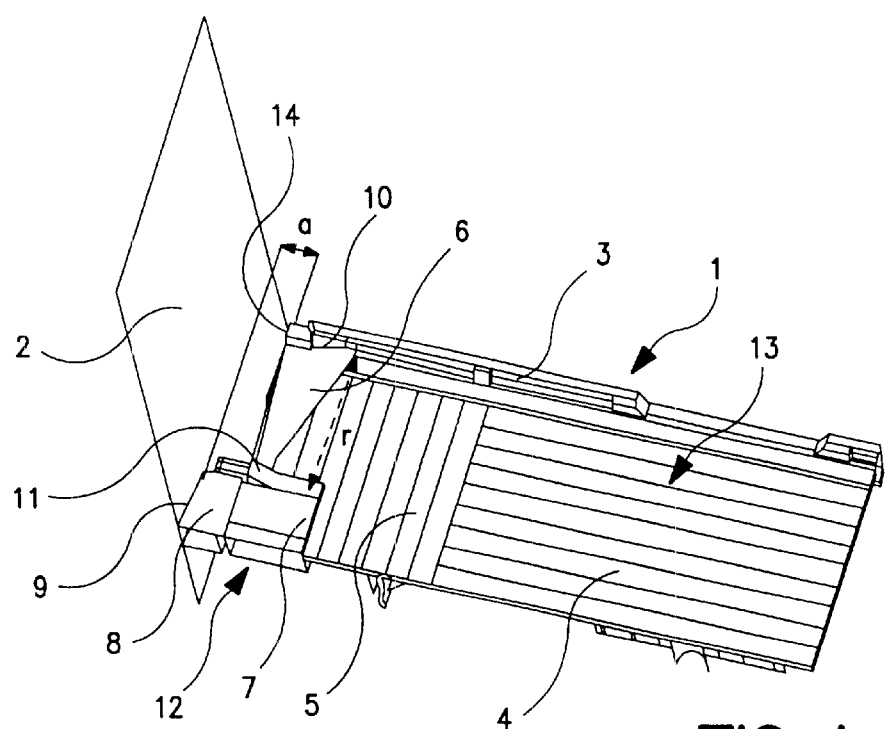
FIG. 1: a schematic perspective view of a section through the floor structure of a railway vehicle containing an arrangement for absorption of energy released on impact, the representation being that of the said arrangement before impact.

The load bearing floor structure 1 of the railway vehicle according to FIG. 1 contains a vehicle floor 13 with transverse floor sections 5 and longitudinal floor sections 4 which are in the form of multi-chamber hollow sections, arranged in rows with the long sides welded together. In the front section the transverse floor sections 5 are arranged transverse to the longitudinal direction of the vehicle. The longitudinal floor sections 4 in the rear lying section are arranged in the longitudinal direction of the vehicle.

In the transverse direction of the vehicle only half of the side of the floor structure 1 is shown here, the other half of the floor structure 1—not shown here—is the mirror image of the part shown in the drawing. A longitudinal beam 3 closes off the side of the floor structure. This is likewise in the form of a multi-chamber hollow section.

An insert 6 of length r is situated in the transverse direction of the vehicle and is mounted with its first end wall 10 by welding to the long side of the front end section of the longitudinal beam 3 of the vehicle. The insert 6 covers an area and is trapezium-shaped. It has a wall thickness of less than 5 mm.

A second end wall 11 of the insert 6 is joined by welding to a central collision component 12 containing an anti-climbing device 8 with intermediate part 7. The end face of the anti-climbing device 8 is arranged at the front end and forms the impact face 9 which projects over the front end face 14 of the longitudinal beam 3 of the vehicle by a distance "a". The distance "a" may amount to several centimetres up to several decimetres e.g. 20 to 50 cm, in particular 25 to 35 cm.

The insert 6 is welded to the vehicle floor 13. This way the stiffness of the insert 6 is in-creased.

Figure 2:
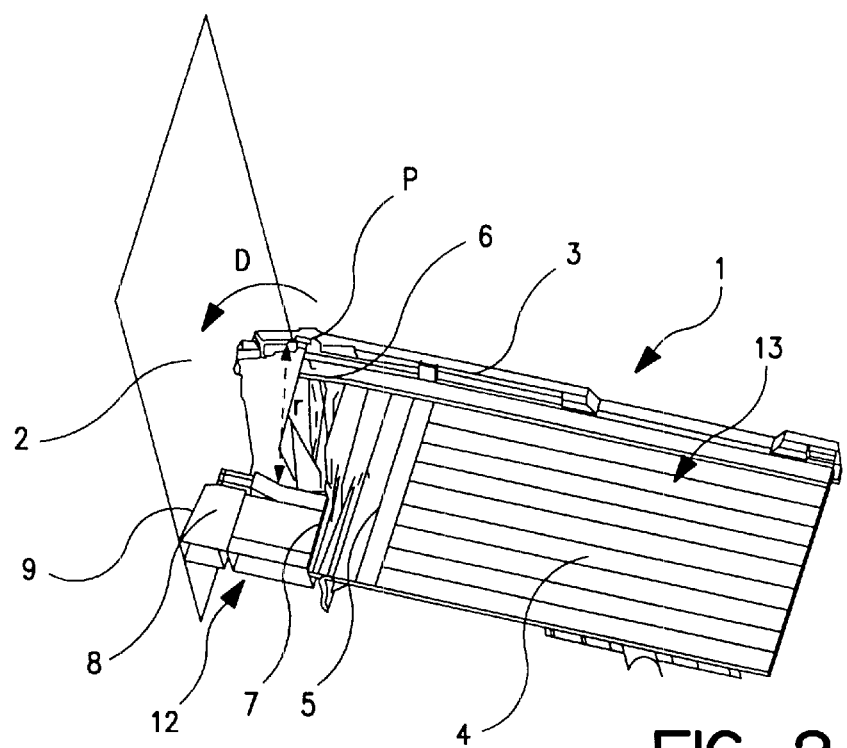
FIG. 2: a schematic perspective view of a section through the floor structure of a railway vehicle containing an arrangement for absorption of energy released on impact, the representation being that of the said arrangement during or after impact.

As a result of the railway vehicle colliding with the barrier 2, the collision component 12 is displaced backward a distance "a" in the longitudinal direction of the vehicle—counter to the force of impact. The displacement of the collision component 12 causes the insert 6 to rotate in direction D about the point P along an arc of radius r (FIG. 2). Further, the change of position of the insert 6 causes compaction and deformation of the transverse floor section 5.

The longitudinal beam 3 suffers a bend at the point of rotation P. Energy arising from the impact is absorbed as a result of this bending. After the impact area 9 of the collision component 12 has been displaced a distance "a", the force of impact begins to act on the longitudinal beam 3. As the force of impact does not act directly on the front of the end face but on the bent section of the beam 3 i.e. on its corner region between the end face and the long side, the longitudinal beam or the bent length is made to bend in a uniform, controlled manner, as a result of which energy of impact is absorbed and the peak force is broken. As a consequence of the longitudinal beam bending at point P, the longitudinal beam is bent not only at point P but successively at other places—in particular starting from point P—as the force continues to act on the structure.

The energy absorbing arrangement shown in FIGS. 1 and 2 is suitable both for the front and the rear parts of the vehicle. Further, the arrangement according to the invention may also be employed for the opposite lying longitudinal beam of the vehicle—not shown here—so that e.g. two such inserts 6 may be incorporated both in the front and in the rear of the vehicle.

Figure 3:
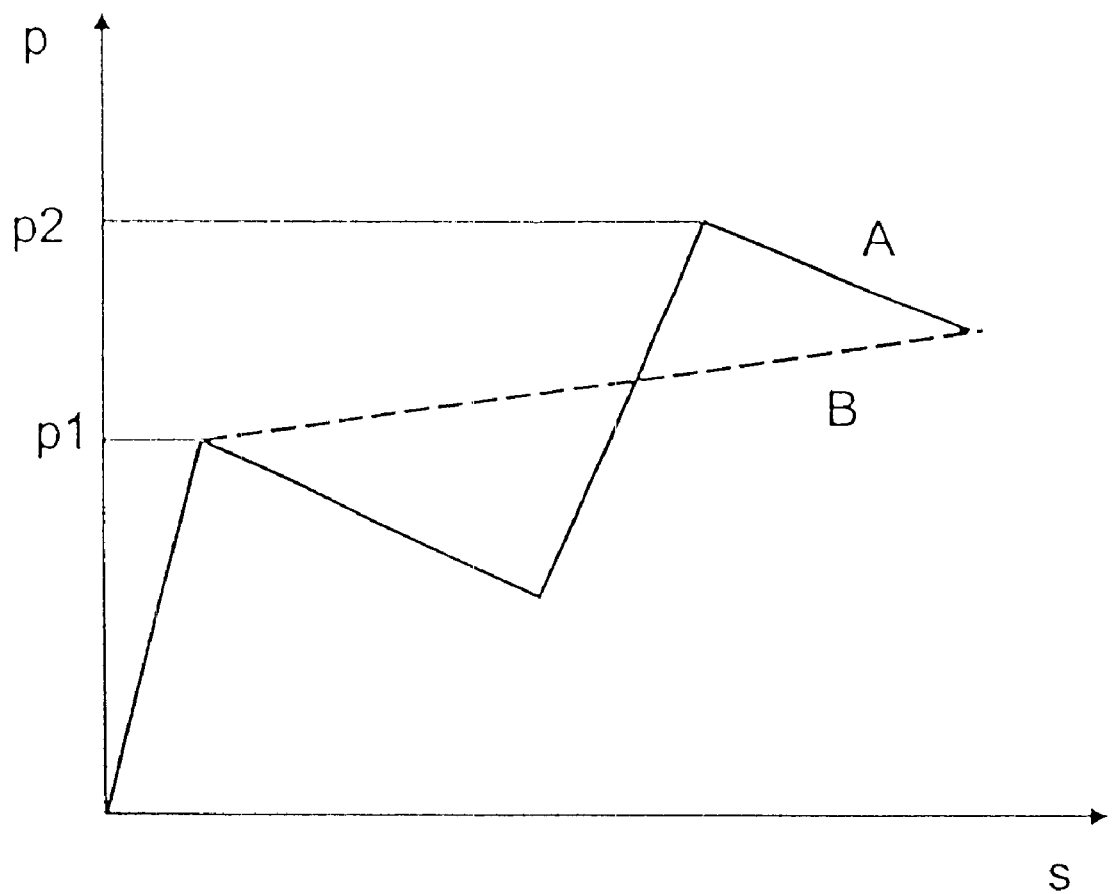
FIG. 3: a schematic load-distance diagram during impact of a vehicle.

Curves A and B in FIG. 3 show schematically the progress of the force of impact p as a function of the distance s of deformation in the longitudinal direction of the vehicle, whereby the point where s=0 represents the point of impact of the obstacle with the area of impact.

Curve A shows schematically the progress of the force of impact in a vehicle with conventional deformation elements such as e.g. tube section lengths, or a vehicle frame construction without the arrangement according to the invention. Curve B shows the schematically the progress of the force of impact in a vehicle featuring the arrangement according to the invention as in FIGS. 1 and 2.

Up to the first peak in force $p_1$ both curves A and B are identical. The peak force $p_1$ is the initial peak force at the start of deformation when the obstacle 2 collides with the area of impact 9.

In the case of curve A, as deformation progresses, the force drops because the obstacle meets less resistance after deformation of the deformation component has started. After some deformation has taken place, the full force of impact acts on the end section or end face 14 of the longitudinal beam 3, giving rise to a significant peak force $p_2$. The longitudinal beam reacts extremely rigidly towards the impinging force and starts to bend only after a very high force is applied to it, hence the high peak force.

In the case of curve B, as deformation progresses the force acting again increases. This illustrates an increasing reduction in the energy of impact which on the one hand is due to the bending of the longitudinal beam 3 by the insert 6 and on the other hand to the deforming of the transverse floor section 5 which is conceived in this part of the vehicle as an energy absorbing structure. After the deformation has progressed a distance "a", the impacting force acts on the bent longitudinal beam 3. In this phase the longitudinal beam 3 has already been weakened so much by bending that progressive deformation causes it to bend further and the hollow structure to be compressed. Because of this, and as a result of the additional absorption of energy due to the bending of the longitudinal beam 3, there is no second peak force $p_2$ as in curve A.

As the area under the force-displacement curve A and B corresponds to the energy of deformation, it can be understood from FIG. 3 that the arrangement according to the invention exhibits a much better capacity to compensate for the energy of impact than does a conventional construction.

What is claimed is:

1. In a vehicle having a floor structure including a first end face, a second end face, and a pair of opposed sides extending therebetween wherein a longitudinal beam runs parallel to the side of the floor structure and has an end face, an arrangement for absorption of energy released on impact comprises:

a collision component mounted on the floor structure which includes an impact area which extends a distance (a) beyond the end face of the longitudinal beam; an insert having a first side end face connected to the longitudinal beam, a second side end face coupled to the collision component, wherein a force of impact acting on the impact area, while displacing the collision component in the direction of the force of impact, effects a rotational movement of the insert about a predetermined point of rotation (P) in the longitudinal beam and local bending of the longitudinal beam at the point of rotation (P) by some degrees of angle.

2. An arrangement according to claim 1, wherein said insert further includes a third front face connecting the first and second side end faces along the one end face of the floor structure and a fourth rear face extending at an acute angle from the longitudinal beam to the collision component.

3. An arrangement according to claim 1, wherein the insert is in the form of a rigid lever arm of length (r).

4. An arrangement according to claim 3, wherein the point of rotation (P) lies in an edge region of the connection between the insert and the longitudinal beam, in such a manner such that a force of impact acting on the impact area effects a rotational movement of the insert of radius (r) about the point of rotation (P) and local bending of the longitudinal beam.

5. An arrangement according to claim 1, wherein the longitudinal beam is a multi-chamber hollow section of an aluminum alloy, and the insert is an aluminum alloy.

6. An arrangement according to claim 2, wherein the insert lies on the floor structure and is joined at points by means of welding.

7. An arrangement according to claim 6, wherein the insert is a component having a thickness less than 10 mm.

8. An arrangement according to claim 6, wherein in the region of the insert the floor structure comprises hollow sections of aluminum that are fitted together running transverse to the longitudinal beam.

9. An arrangement according to claim 2, wherein the insert is attached to an end section of the longitudinal beam next to the one end face of the floor structure.

10. An arrangement according to claim 1, wherein at least one deformation element is arranged behind the impact area, in such a manner that a part of the energy of impact is absorbed by the deformation element before, after and during the rotation of the insert.

11. An arrangement according to claim 8, wherein at least one deformation element is coupled to the insert in such a manner that the force of impact is diverted via the insert partly onto the deformation element and partly onto the longitudinal beam.

12. An arrangement according to claim 1, wherein the arrangement is situated in the front and rear region of the vehicle and the longitudinal beam is a vehicle frame, and the insert is arranged transverse to the longitudinal direction of the vehicle, and the impact area projects a distance (a) out from an end face of the longitudinal beam.

* * * * *